United States Patent
Budnik

[19]

[11] Patent Number: 5,953,555
[45] Date of Patent: Sep. 14, 1999

[54] AUTOMATIC ADJUSTMENT OF AREA COVERAGE DETECTOR POSITION

[75] Inventor: Roger W. Budnik, Rochester, N.Y.

[73] Assignee: Xerox Corporation, Stamford, Conn.

[21] Appl. No.: 09/274,066

[22] Filed: Mar. 22, 1999

Related U.S. Application Data

[60] Provisional application No. 60/081,801, Apr. 15, 1998.
[51] Int. Cl.$^6$ ................................................. G03G 15/00
[52] U.S. Cl. .............................................................. 399/49
[58] Field of Search .............................. 399/26, 49, 159, 399/160, 162

[56] References Cited

U.S. PATENT DOCUMENTS 5,119,131  6/1992  Paolini et al. ............................ 399/54
5,436,705  7/1995  Raj ............................................ 399/59

*Primary Examiner*—Arthur T. Grimley
*Assistant Examiner*—Hoang Ngo
*Attorney, Agent, or Firm*—Kevin R. Kepner

[57] ABSTRACT

A method to automatically adjust the timing of a process control toner patch reading in an electrophotographic printing machine. A solid area patch of width "X" is generated by the ROS at the time "T" from pitch reset. Theoretically, the centerline of this patch (X/2) should arrive at the BTAC location in a time of "T+distance from pitch reset to BTAC". A series of evenly spaced reads are taken by the BTAC of the solid area patch. This sampling generates a waveform. The area of this waveform is calculated and the center of moment is found This "real" centerline of the patch is then compared to the theoretical centerline and the delta (+or −) is stored in memory. This provides a read adjustment to maintain accurate process controls.

1 Claim, 3 Drawing Sheets

AUTOMATIC ADJUSTMENT OF AREA COVERAGE DETECTOR POSITION

This application is based on a provisional patent application Ser. No. 60/081,801 filed Apr. 15, 1998.

This invention relates generally to an apparatus and method for locating a seam on a photoreceptor in an electrophotographic printing machine, and more particularly concerns an improved apparatus and method for calibrating and eliminating noise in such a locating sensor.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charges thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

In the xerographic subsystem as described above of any marking device (copier, printer, etc.) that contains some form of process controls, a critical parameter that must be maintained is the accurate read timing of the process control patches relative to the black toner area coverage (BTAC) sensor. This invention automatically adjusts this parameter through the machine's logic.

As the unit manufacturing cost (UMC) for xerographic engines is reduced (i.e. looser tolerances, fewer sensors, etc.) the complexity of the process control algorithms has increased exponentially in order to maintain the level of copy. This in turn has led to interdocument zones (IDZ) which are literally crammed with process control patches. Consequently, the ability to read the reflectances of these individual patches becomes critical to the success of the process control schemes. This invention automatically adjusts for any positional error of the area coverage sensor in the process direction, this insuring accurate patch reads.

In accordance with one aspect of the present invention, there is provided a method of automatically adjusting the read time for a process control patch in an electrophotographic printing machine, comprising generating a solid area patch of width "X" at a time "T" from pitch reset, performing a plurality of evenly spaced reads of the patch, generating a waveform as a function of the plurality of evenly spaced reads, calculating the area of the generated waveform, comparing the center of moment of the waveform to a predetermined centerline and determining and storing a delta between the waveform center of moment and the predetermined centerline to provide an automatic timing adjustment.

Other features of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
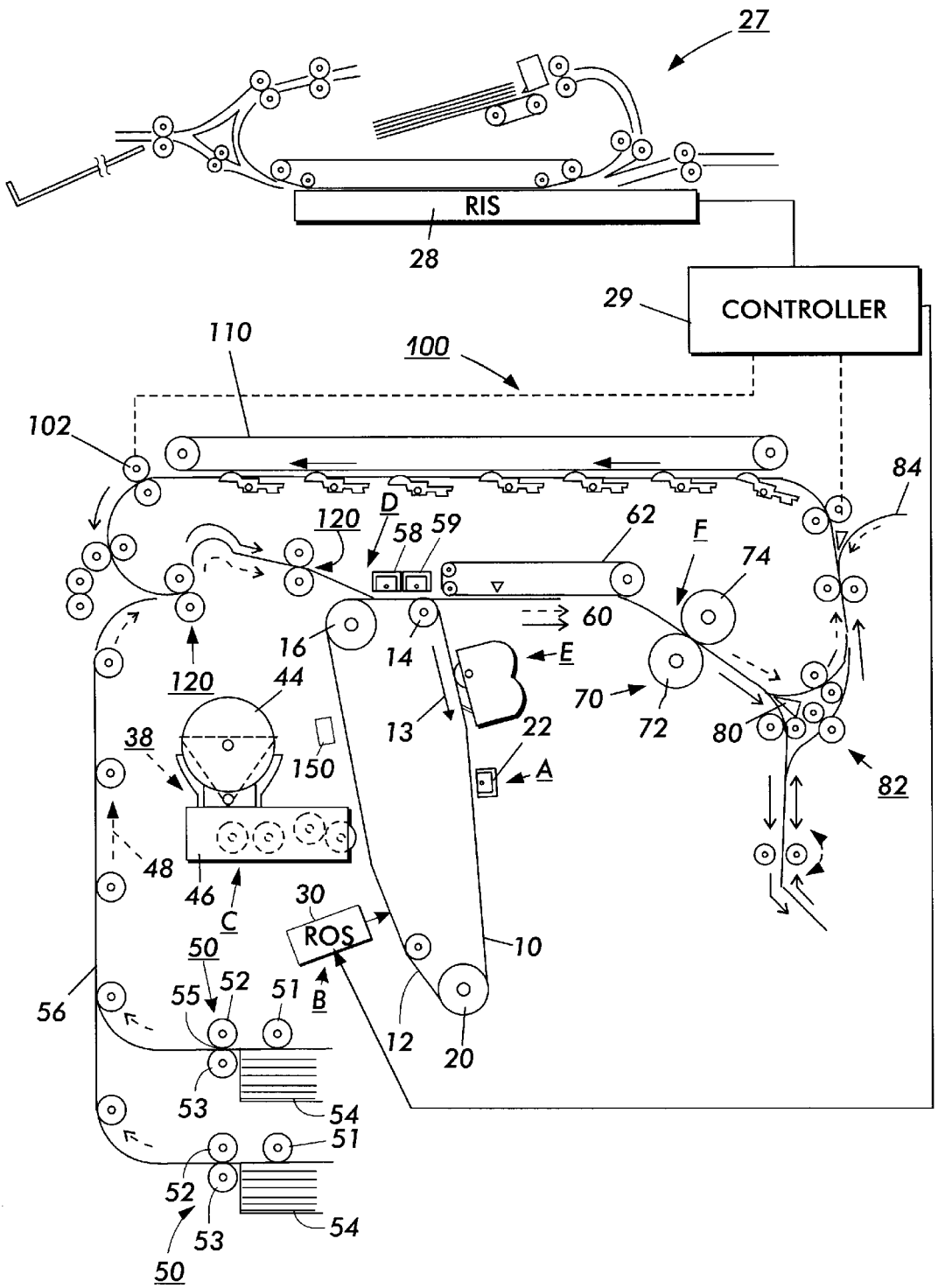
FIG. 1 is a schematic elevational view of a typical electrophotographic printing machine utilizing the sheet deskew and registration device of the present invention.

For a general understanding of the features of the present invention, reference is made to the drawings. In the drawings, like reference numerals have been used throughout to identify identical elements. FIG. 1 schematically depicts an electrophotographic printing machine incorporating the features of the present invention therein. It will become evident from the following discussion that the stalled roll registration device of the present invention may be employed in a wide variety of devices and is not specifically limited in its application to the particular embodiment depicted herein.

Referring to FIG. 1 of the drawings, an original document is positioned in a document handler 27 on a raster input scanner (RIS) indicated generally by reference numeral 28. The RIS contains document illumination lamps, optics, a mechanical scanning drive and a charge coupled device (CCD) array. The RIS captures the entire original document and converts it to a series of raster scan lines. This information is transmitted to an electronic subsystem (ESS) which controls a raster output scanner (ROS) described below.

FIG. 1 schematically illustrates an electrophotographic printing machine which generally employs a photoconductive belt 10. Preferably, the photoconductive belt 10 is made from a photoconductive material coated on a ground layer, which, in turn, is coated on an anti-curl backing layer. Belt 10 moves in the direction of arrow 13 to advance successive portions sequentially through the various processing stations disposed about the path of movement thereof. Belt 10 is entrained about stripping roller 14, tensioning roller 20 and drive roller 16. As roller 16 rotates, it advances belt 10 in the direction of arrow 13.

Initially, a portion of the photoconductive surface passes through charging station A. At charging station A, a corona generating device indicated generally by the reference numeral 22 charges the photoconductive belt 10 to a relatively high, substantially uniform potential.

At an exposure station, B, a controller or electronic subsystem (ESS), indicated generally by reference numeral 29, receives the image signals representing the desired output image and processes these signals to convert them to a continuous tone or greyscale rendition of the image which is transmitted to a modulated output generator, for example the raster output scanner (ROS), indicated generally by reference numeral 30. Preferably, ESS 29 is a self-contained, dedicated minicomputer. The image signals transmitted to ESS 29 may originate from a RIS as described above or from a computer, thereby enabling the electrophotographic printing machine to serve as a remotely located printer for one or more computers. Alternatively, the printer may serve as a dedicated printer for a high-speed computer. The signals from ESS 29, corresponding to the continuous tone image desired to be reproduced by the printing machine, are transmitted to ROS 30. ROS 30 includes a laser with rotating polygon mirror blocks. The ROS will expose the photoconductive belt to record an electrostatic latent image thereon corresponding to the continuous tone image received from ESS 29. As an alternative, ROS 30 may employ a linear array of light emitting diodes (LEDs) arranged to illuminate the charged portion of photoconductive belt 10 on a raster-by-raster basis.

After the electrostatic latent image has been recorded on photoconductive surface 12, belt 10 advances the latent image to a development station, C, where toner, in the form of liquid or dry particles, is electrostatically attracted to the latent image using commonly known techniques. The latent image attracts toner particles from the carrier granules forming a toner powder image thereon. As successive electrostatic latent images are developed, toner particles are depleted from the developer material. A toner particle dispenser, indicated generally by the reference numeral 44, dispenses toner particles into developer housing 46 of developer unit 38.

With continued reference to FIG. 1, after the electrostatic latent image is developed, the toner powder image present on belt 10 advances to transfer station D. A print sheet 48 is advanced to the transfer station, D, by a sheet feeding apparatus, 50. Preferably, sheet feeding apparatus 50 includes a nudger roll 51 which feeds the uppermost sheet of stack 54 to nip 55 formed by feed roll 52 and retard roll 53. Feed roll 52 rotates to advance the sheet from stack 54 into vertical transport 56. Vertical transport 56 directs the advancing sheet 48 of support material into the registration transport 120 using the array sensor of the invention herein, described in detail below, past image transfer station D to receive an image from photoreceptor belt 10 in a timed sequence so that the toner powder image formed thereon contacts the advancing sheet 48 at transfer station D. Transfer station D includes a corona generating device 58 which sprays ions onto the back side of sheet 48. This attracts the toner powder image from photoconductive surface 12 to sheet 48. The sheet is then detacked from the photoreceptor by corona generating device 59 which sprays oppositely charged ions onto the back side of sheet 48 to assist in removing the sheet from the photoreceptor. After transfer, sheet 48 continues to move in the direction of arrow 60 by way of belt transport 62 which advances sheet 48 to fusing station F.

Fusing station F includes a fuser assembly indicated generally by the reference numeral 70 which permanently affixes the transferred toner powder image to the copy sheet. Preferably, fuser assembly 70 includes a heated fuser roller 72 and a pressure roller 74 with the powder image on the copy sheet contacting fuser roller 72. The pressure roller is cammed against the fuser roller to provide the necessary pressure to fix the toner powder image to the copy sheet. The fuser roll is internally heated by a quartz lamp (not shown). Release agent, stored in a reservoir (not shown), is pumped to a metering roll (not shown). A trim blade (not shown) trims off the excess release agent. The release agent transfers to a donor roll (not shown) and then to the fuser roll 72.

The sheet then passes through fuser 70 where the image is permanently fixed or fused to the sheet. After passing through fuser 70, a gate 80 either allows the sheet to move directly via output 16 to a finisher or stacker, or deflects the sheet into the duplex path 100, specifically, first into single sheet inverter 82 here. That is, if the sheet is either a simplex sheet, or a completed duplex sheet having both side one and side two images formed thereon, the sheet will be conveyed via gate 80 directly to output 84. However, if the sheet is being duplexed and is then only printed with a side one image, the gate 80 will be positioned to deflect that sheet into the inverter 82 and into the duplex loop path 100, where that sheet will be inverted and then fed to acceleration nip 102 and belt transports 110, for recirculation back through transfer station D and fuser 70 for receiving and permanently fixing the side two image to the backside of that duplex sheet, before it exits via exit path 84.

After the print sheet is separated from photoconductive surface 12 of belt 10, the residual toner/developer and paper fiber particles adhering to photoconductive surface 12 are removed therefrom at cleaning station E. Cleaning station E includes a rotatably mounted fibrous brush in contact with photoconductive surface 12 to disturb and remove paper fibers and a cleaning blade to remove the nontransferred toner particles. The blade may be configured in either a wiper or doctor position depending on the application. Subsequent to cleaning, a discharge lamp (not shown) floods photoconductive surface 12 with light to dissipate any residual electrostatic charge remaining thereon prior to the charging thereof for the next successive imaging cycle.

The various machine functions are regulated by controller 29. The controller is preferably a programmable microprocessor which controls all of the machine functions hereinbefore described. The controller provides a comparison count of the copy sheets, the number of documents being recirculated, the number of copy sheets selected by the operator, time delays, jam corrections, etc.. The control of all of the exemplary systems heretofore described may be accomplished by conventional control switch inputs from the printing machine consoles selected by the operator. Conventional sheet path sensors or switches may be utilized to keep track of the position of the document and the copy sheets.

Figure 2:
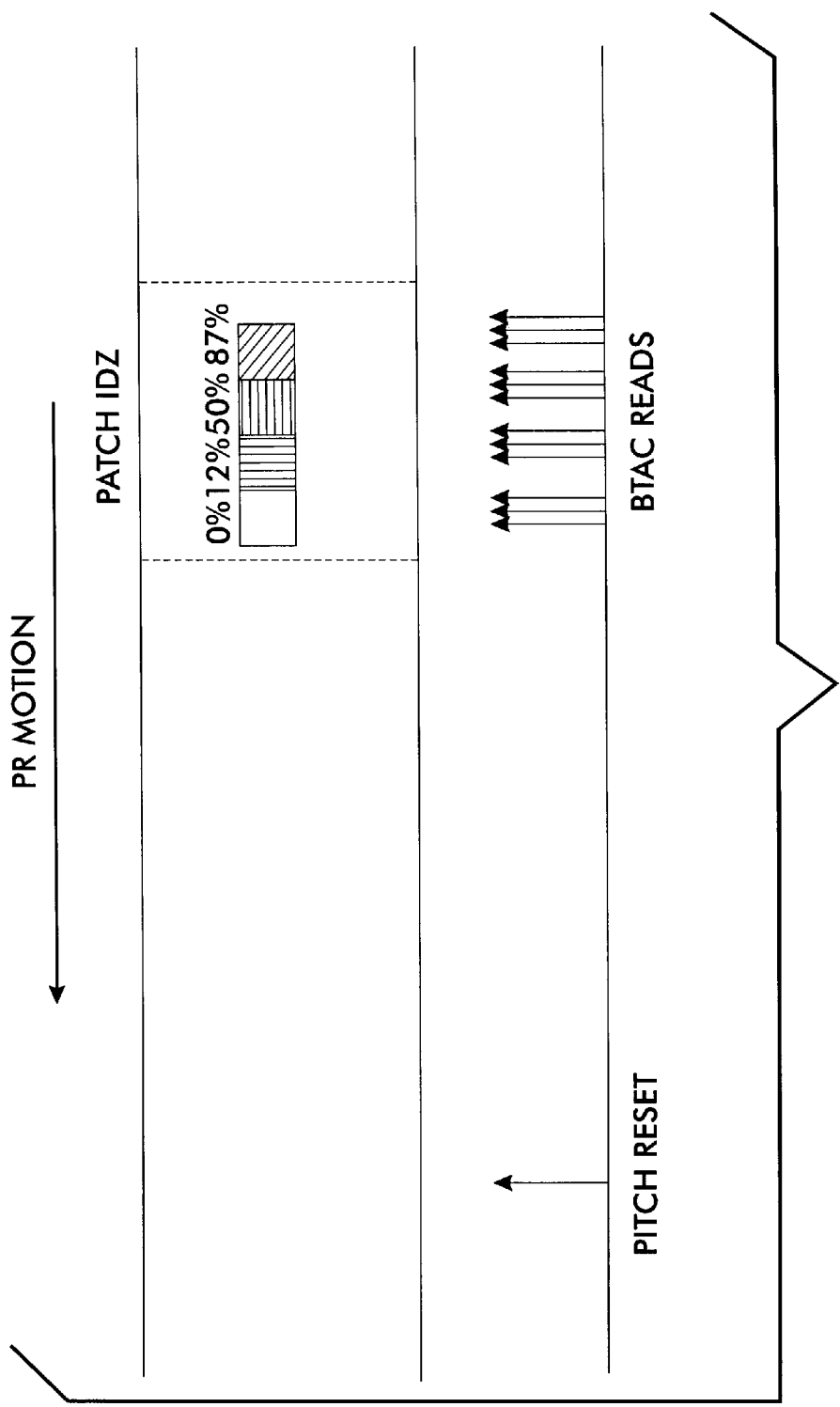
FIG. 2 is an illustration of an IDZ patch read by a BTAC sensor.

FIG. 2 is an illustration of the readings that a BTAC sensor (reference numeral 150 in FIG. 1) might make on an IDZ patch. The adjustment for any positional error of the area coverage sensor in the process direction is based on the fact that a raster output scanner (ROS) can position a process control patch within one scan line (typically 0.0845 mm) in reference to some timing signal (pitch reset). The read of this patch by the area coverage sensor is based from the same timing signal The theoretical centerlines of the ROS and the area coverage sensor is known from the architectural drawings of the xerographic subsystem. With these facts, an algorithm has been devised to correct for any positional inaccuracies of the area coverage sensor. This avoids the mislocating of the sensor readings which in the illustration of FIG. 2 might shift the reading into an adjacent patch.

Figure 3:
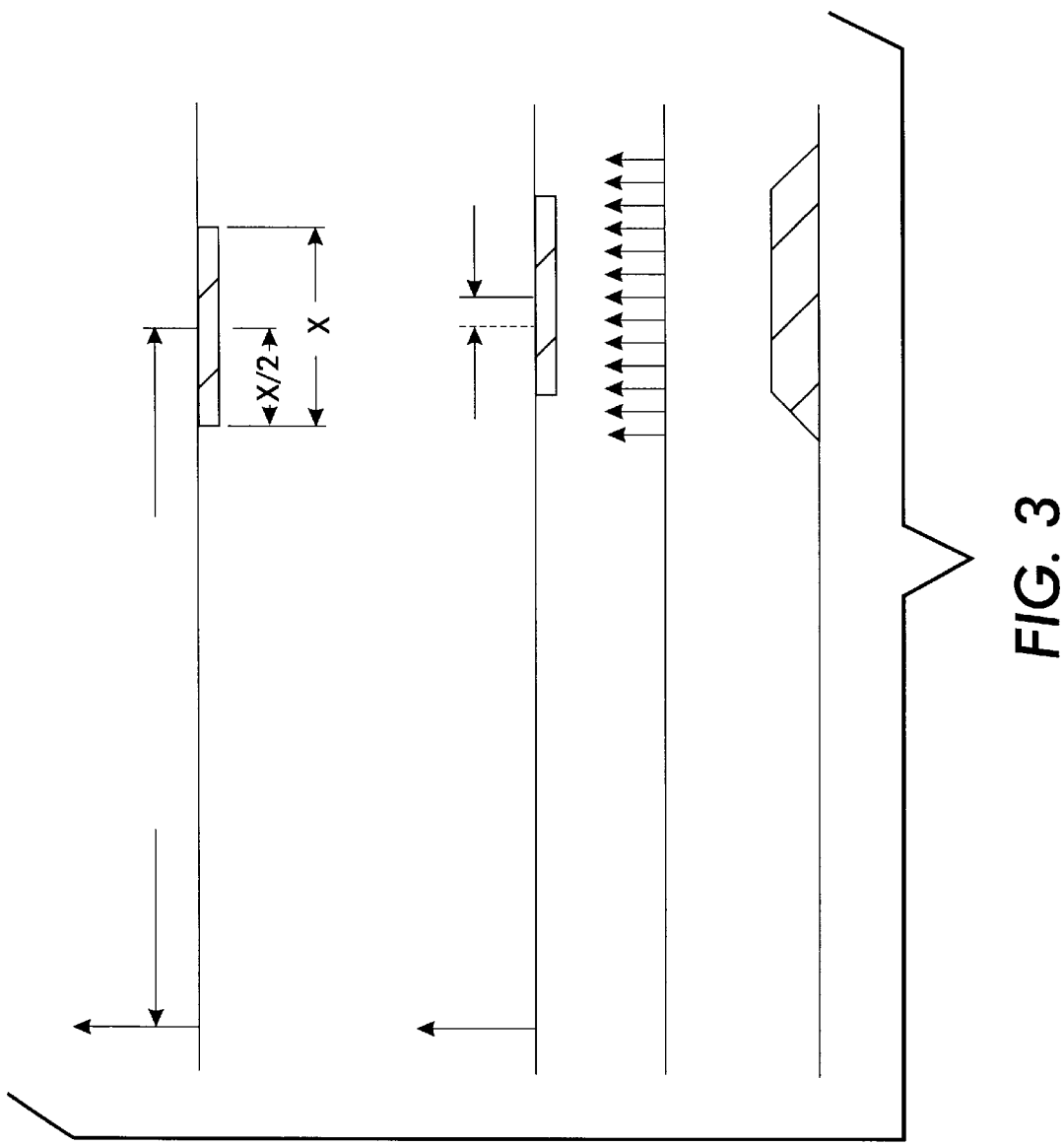
FIG. 3 is an illustration of the theoretical and actual patch and location determining scheme.

As shown in FIG. 3 a solid area patch of width "X" is generated y the ROS at the time "T" from pitch reset. Theoretically, the centerline of this patch (X/2) should arrive at the BTAC location in a time of "T+distance from pitch reset to BTAC". A series of evenly spaced reads are taken by the BTAC of the solid area patch. This sampling generates a waveform as shown in FIG. 3. The area of this waveform is calculated and the center of moment is found This "real" centerline of the patch is then compared to the theoretical centerline and the delta (+or −) is stored in memory. The BTAC position has now been adjusted and all proceeding BTAC reads are adjusted by this delta., thus insuring very high accuracy.

This invention has been applied successfully and has proved to be a highly accurate and automatic method of adjustment. The accuracy obtained is +/−1 mc (0.35 mm).

In recapitulation, there is provided a method to automatically adjust the timing of a process control toner patch reading in an electrophotographic printing machine . A solid area patch of width "X" is generated by the ROS at the time "T" from pitch reset. Theoretically, the centerline of this patch (X/2) should arrive at the BTAC location in a time of "T+distance from pitch reset to BTAC". A series of evenly spaced reads are taken by the BTAC of the solid area patch. This sampling generates a waveform. The area of this waveform is calculated and the center of moment is found. This "real" centerline of the patch is then compared to the theoretical centerline and the delta (+or −) is stored in memory. This provides a read adjustment to maintain accurate process controls.

It is, therefore, apparent that there has been provided in accordance with the present invention, a noise elimination and sensor calibration apparatus and method that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method of automatically adjusting the read time for a process control patch in an electrophotographic printing machine, comprising:

generating A solid area patch of width "X" at a time "T" from pitch reset;

performing a plurality of evenly spaced reads of the patch;

generating a waveform as a function of the plurality of evenly spaced reads;

calculating the area of the generated waveform;

comparing the center of moment of the waveform to a predetermined centerline;

determining and storing a delta between the waveform center of moment and the predetermined centerline to provide an automatic timing adjustment.

* * * * *